United States Patent
Ge et al.

(10) Patent No.: US 12,506,677 B2
(45) Date of Patent: Dec. 23, 2025

(54) ROUTE SENDING METHOD AND DEVICE

(71) Applicant: HUAWEI TECHNOLOGIES CO., LTD., Guangdong (CN)

(72) Inventors: Jun Ge, Beijing (CN); Haibo Wang, Beijing (CN); Lili Wang, Beijing (CN); Lei Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 538 days.

(21) Appl. No.: 17/901,555

(22) Filed: Sep. 1, 2022

(65) Prior Publication Data

US 2022/0417152 A1 Dec. 29, 2022

Related U.S. Application Data

(63) Continuation of application No. PCT/CN2021/079231, filed on Mar. 5, 2021.

(30) Foreign Application Priority Data

Mar. 5, 2020 (CN) .......................... 202010146667.8

(51) Int. Cl.
*H04L 45/741* (2022.01)
*H04L 45/02* (2022.01)
(Continued)

(52) U.S. Cl.
CPC ............ *H04L 45/021* (2013.01); *H04L 45/02* (2013.01); *H04L 45/12* (2013.01); *H04L 45/741* (2013.01); *H04L 61/5007* (2022.05)

(58) Field of Classification Search
CPC ....... H04L 45/021; H04L 45/02; H04L 45/12; H04L 45/741; H04L 61/5007; H04L 45/04; H04L 45/72; H04L 45/08; H04L 45/74
See application file for complete search history.

(56) References Cited

U.S. PATENT DOCUMENTS 7,382,769 B1 6/2008 Rijsman
9,860,169 B1 * 1/2018 Ninan ................... H04L 45/033
(Continued)

FOREIGN PATENT DOCUMENTS

CN 1816036 A 8/2006
CN 102316019 A 1/2012
(Continued)

OTHER PUBLICATIONS

Guan Lian, Research on QoS Guarantee Based on Multi Nexthop Routing Mechanisms, 2012, 3 pages (abstract).
(Continued)

*Primary Examiner* — Jay P Patel
(74) *Attorney, Agent, or Firm* — WOMBLE BOND DICKINSON (US) LLP

(57) ABSTRACT

A route sending method and a device are provided. The method includes: A second network device receives a first route sent by a first network device, where the first route includes an IP address of a source network device and first identification information identifying that an IP address of the first network device belongs to a first type, and the first network device is a next-hop network device of the source network device. The second network device sends the first route, where the first route is a route determined by the second network device based on a first route group, and the first route group is determined based on the IP address of the source network device and the first type, so that routes having the same IP address of the source network device but different types of next-hop addresses can be allocated to different route groups.

18 Claims, 4 Drawing Sheets

(51) Int. Cl.
*H04L 45/021* (2022.01)
*H04L 45/12* (2022.01)
*H04L 61/5007* (2022.01)

(56) References Cited

U.S. PATENT DOCUMENTS

| | | | |
|---|---|---|---|
| 9,992,154 B2 * | 6/2018 | Bickhart | H04L 12/4641 |
| 9,992,161 B2 | 6/2018 | Diaz et al. | |
| 10,757,008 B2 * | 8/2020 | Li | H04L 45/586 |
| 2008/0205401 A1 | 8/2008 | Mirtorabi et al. | |
| 2011/0080911 A1 | 4/2011 | Guichard et al. | |
| 2015/0016456 A1 | 1/2015 | Ramanathan et al. | |
| 2016/0226711 A1 * | 8/2016 | Liljenstolpe | H04L 45/48 |
| 2016/0226760 A1 * | 8/2016 | Liljenstolpe | H04L 45/04 |
| 2017/0195210 A1 * | 7/2017 | Jacob | H04L 45/22 |
| 2017/0289216 A1 * | 10/2017 | N | H04L 45/22 |
| 2017/0373973 A1 * | 12/2017 | Bickhart | H04L 12/4604 |
| 2018/0006995 A1 * | 1/2018 | Bickhart | H04L 45/66 |
| 2018/0287990 A1 * | 10/2018 | Bickhart | H04L 12/4625 |
| 2019/0190811 A1 | 6/2019 | Selvaraj et al. | |
| 2019/0356578 A1 | 11/2019 | Gao et al. | |
| 2021/0328906 A1 * | 10/2021 | Peng | H04L 12/4633 |

FOREIGN PATENT DOCUMENTS

| | | |
|---|---|---|
| CN | 103379033 A | 10/2013 |
| CN | 108259205 A | 7/2018 |
| CN | 108270671 A | 7/2018 |
| CN | 108880840 A | 11/2018 |
| CN | 108989212 A | 12/2018 |
| CN | 110611615 A | 12/2019 |
| JP | 2012054648 A | 3/2012 |
| WO | 2016133821 A1 | 8/2016 |
| WO | 2017134537 A1 | 8/2017 |

OTHER PUBLICATIONS

Y. Rekhter, Ed. et al: "A Border Gateway Protocol 4 (BGP-4)", rfc4271, Network Working Group, Category: Standards Track, Jan. 2006, 104 pages.
D. Walton et al, Advertisement of Multiple Paths in BGP, rfc 7911, Jul. 2016, 8 pages.
E. Rosen et al, BGP/MPLS IP Virtual Private Networks (VPNs). RFC4364, Feb. 2006, 47 pages.
G. Dawra, Ed. et al , SRv6 BGP based Overlay services; draft-dawra-bess-srv6-services-02, Jul. 8, 2019,28 pages.

* cited by examiner

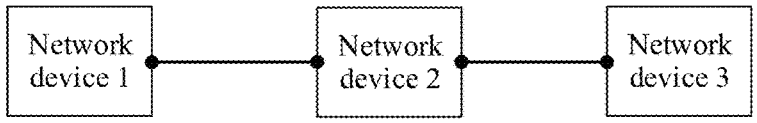
FIG. 1
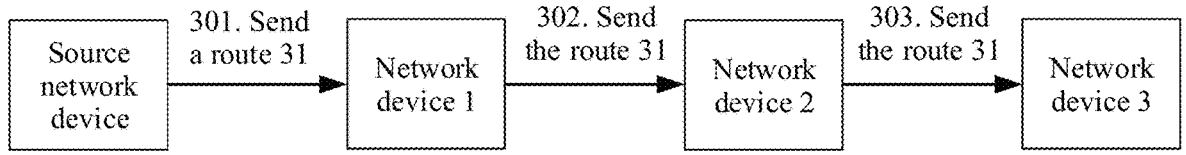
FIG. 2
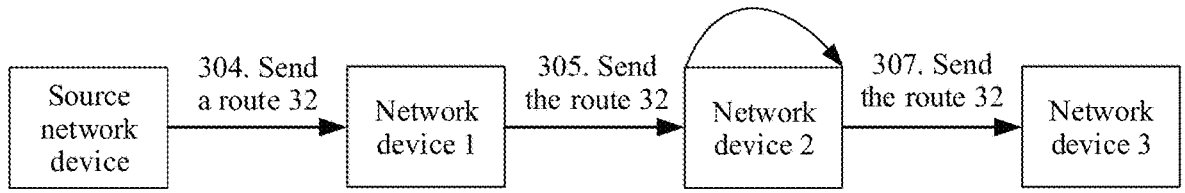
FIG. 3a
FIG. 3b

ROUTE SENDING METHOD AND DEVICE

CROSS-REFERENCE TO RELATED APPLICATIONS

This application is a continuation of International Application No. PCT/CN2021/079231, filed on Mar. 5, 2021, which claims priority to Chinese Patent Application No. 202010146667.8, filed on Mar. 5, 2020. Both of the aforementioned applications are hereby incorporated by reference in their entireties.

TECHNICAL FIELD

This application relates to the field of communication technologies, and in particular, to a route sending method and a device.

BACKGROUND

In a network, routes in a same address family may be learned of between neighboring network devices. For example, routes in a Border Gateway Protocol (BGP)—based virtual private network-Internet Protocol version 4 (VPNv4) address family may be learned of between Internet Protocol version 4 (IPv4) neighboring network devices using a route reflector.

With network evolution, IPv4 neighbors and IPv6 neighbors coexist in a same address family. According to related protocols, the route reflector needs to select an optimal route from a plurality of routes with a same prefix for sending. For example, if a next-hop address of the optimal route is an IPv4 neighbor, the route reflector can send the optimal route only to a neighboring network device supporting IPv4; if a next-hop address of the optimal route is an IPv6 neighbor, the route reflector can send the optimal route only to a neighboring network device supporting IPv6. As a result, network devices are prone to fail to learn of corresponding routes.

SUMMARY

This application provides a route sending method and a device. A route is allocated to a corresponding route group based on a type of a next-hop address, and a route is independently selected from route groups for sending. This ensures that all network devices supporting different address types can normally learn of routes, ensures normal operation of services during network evolution, and improves flexibility of route sending.

A first aspect of this application provides a route sending method. During route learning, a second network device receives a first route sent by a first network device, where the first route includes an IP address of a source network device, an IP address of the first network device, and first identification information, the first identification information identifies that the IP address of the first network device belongs to a first type, and the first network device is a next-hop network device of the source network device, that is, the first identification information may identify a type of a next-hop address. The second network device sends the first route, where the first route is a route determined by the second network device based on a first route group. All routes in the first route group have a same IP address of the source network device, and an IP address of the next-hop network device of the source network device included in each of all the routes belongs to the first type. To be specific, after receiving the first route, the second network device may determine, based on the IP address of the source network device and the first identification information in the first route, a route group corresponding to the first route, and determine to send the first route from the route group.

In this solution, after receiving a route, the network device determines, based on the address of the source network device and a type of a next-hop address, a route group to which the route belongs, and determines a to-be-sent route from the route group, so that routes having the same IP address of the source network device but different types of next-hop addresses can be allocated to different route groups. This ensures that network devices supporting different address types can normally learn of routes, ensures normal operation of services during network evolution, and improves flexibility of route sending.

In an embodiment, the first type is an IPv4 type or an IPv6 type, and that the second network device sends the first route includes: If the first type is the IPv4 type, the second network device sends the first route to one or more neighboring network devices supporting IPv4; or if the first type is the IPv6 type, the second network device sends the first route to one or more neighboring network devices supporting IPv6. To be specific, when a type of a next-hop address in the first route is the IPv4 type, the second network device sends the first route to the neighboring network device supporting IPv4, so that the neighboring network device supporting IPv4 can learn of the first route. When a type of a next-hop address in the first route is the IPv6 type, the second network device sends the first route to the neighboring network device supporting IPv6. This implements that the first route is sent pertinently.

In an embodiment, that the first route is a route determined by the second network device based on the first route group specifically includes: The second network device selects the first route from the first route group based on a Border Gateway Protocol best path selection algorithm. To be specific, the second network device selects the optimal first route from the first route group for sending, to ensure that a corresponding network device can learn of the optimal route.

In an embodiment, the method further includes: The second network device receives a second route sent by a third network device, where the second route includes the IP address of the source network device, an IP address of the third network device, and second identification information. The third network device is a next-hop network device of the source network device. The second network device stores the second route to the first route group based on a case that the second identification information belongs to the first type. To be specific, each time the second network device receives a route, the second network device stores the route to a corresponding route group based on the IP address of the source network device in the route and a type corresponding to identification information, to implement route classification.

In an embodiment, the method further includes: The second network device receives a third route sent by the first network device, where the third route includes the IP address of the source network device, the IP address of the first network device, and third identification information. The second network device stores the third route to a second route group based on a case that the third identification information belongs to a second type. To be specific, the second network device stores a route to a corresponding route group based on a type corresponding to identification information in the received route, to ensure that routes having the same IP address of the source network device but different types of next-hop addresses can be allocated to different route groups. In this way, a plurality of routes with a same prefix (that is, a plurality of routes having the same IP address of the source network device) can be sent based on the route groups. This ensures that all network devices with different address types can normally learn of routes.

In an embodiment, that the second network device sends the first route specifically includes: The second network device sends the first route, where the IP address of the next-hop network device of the source network device in the first route is the IP address of the first network device; or the second network device sends the first route, where the first route is an updated first route, and the IP address of the next-hop network device of the source network device in the updated first route is updated to an IP address of the second network device. To be specific, in this solution, the second network device may update or not update the IP address of the next-hop network device in the first route. This improves flexibility of the solution.

In an embodiment, the method further includes: The second network device deploys advertisement of multiple paths ADD-PATH in Border Gateway Protocol based on the first route group, where the first route group includes a plurality of routes. That the second network device sends the first route is specifically that the second network device sends the first route and a second route based on the ADD-PATH, where the second route is one of the plurality of routes in the first route group. To be specific, in this solution, the ADD-PATH technology is introduced on the basis of independent route selection performed based on route groups, so that the second network device sends a plurality of routes in a same route group, and load sharing is implemented between network devices that receive routes based on the plurality of received routes.

In an embodiment, the first route further includes fourth identification information, the fourth identification information identifies an address family to which the first route belongs, and that the first route is a route determined by the second network device based on the first route group specifically includes: The second network device determines the first route group based on the address family identified by the fourth identification information, the IP address of the source network device, and the first type. The second network device determines the first route based on the determined first route group. To be specific, in this solution, the second network device determines, based on an address family to which a route belongs, the IP address of the source network device in the route, and a type corresponding to the route, a route group to which the route belongs. This ensures that the route group corresponding to the route can be correctly determined in case of one or more address families configured for the second network device, and improves feasibility of the solution.

In an embodiment, one or more of the following address families are configured for the second network device: a VPNv4 address family, a VPNv6 address family, an Ethernet virtual private network (EVPN) address family, or a mobile virtual private network (MVPN) address family.

A second aspect of this application provides a network device, including: a receiving unit, configured to receive a first route sent by a first network device, where the first route includes an Internet Protocol IP address of a source network device, an IP address of the first network device, and first identification information, the first identification information identifies that the IP address of the first network device belongs to a first type, and the first network device is a next-hop network device of the source network device; and a sending unit, configured to send the first route, where the first route is a route determined by the second network device based on a first route group, all routes in the first route group have the same IP address of the source network device, and an IP address of the next-hop network device of the source network device included in each of all the routes belongs to the first type.

In an embodiment, the first type is an IPv4 type or an IPv6 type. The sending unit is specifically configured to: if the first type is the IPv4 type, send the first route to one or more neighboring network devices supporting IPv4; or if the first type is the IPv6 type, send the first route to one or more neighboring network devices supporting IPv6.

In an embodiment, the network device further includes a processing unit, configured to select the first route from the first route group based on a Border Gateway Protocol best path selection algorithm.

In an embodiment, the receiving unit is further configured to receive a second route sent by a third network device, where the first route includes the IP address of the source network device, an IP address of the third network device, and second identification information, and the third network device is a next-hop network device of the source network device. The network device further includes a processing unit, configured to store the second route to the first route group based on a case that the second identification information belongs to the first type.

In an embodiment, the receiving unit is further configured to receive a third route sent by the first network device, where the third route includes the IP address of the source network device, the IP address of the first network device, and third identification information. The network device further includes a processing unit, configured to store the third route to a second route group based on a case that the third identification information belongs to a second type.

In an embodiment, the sending unit is further configured to send the first route, where an IP address of the next-hop network device of the source network device in the first route is the IP address of the first network device; or send the first route, where the first route is an updated first route, and an IP address of the next-hop network device of the source network device in the updated first route is updated to an IP address of the second network device.

In an embodiment, the network device further includes a processing unit, configured to deploy ADD-PATH based on the first route group, where the first route group includes a plurality of routes. The sending unit is further configured to send the first route and a second route based on the ADD-PATH, where the second route is one of the plurality of routes in the first route group.

In an embodiment, the first route further includes fourth identification information, and the fourth identification information identifies an address family to which the first route belongs. The network device further includes a processing unit, configured to determine the first route group based on the address family identified by the fourth identification information, the IP address of the source network device, and the first type; and determine the first route based on the determined first route group.

In an embodiment, one or more of the following address families are configured for the second network device: a VPNv4 address family, a VPNv6 address family, an EVPN address family, or an MVPN address family.

A third aspect of this application provides a network device. The network device includes a processor and a memory. The memory is configured to store instructions.

The processor is configured to execute the instructions in the memory, so that the network device performs the method according to any one of the implementations of the first aspect.

A fourth aspect of this application provides a network device. The network device includes a processor. The processor is coupled to a memory. The processor is configured to execute instructions in the memory, so that the network device performs the method according to any one of the implementations of the first aspect.

A fifth aspect of this application provides a non-transitory computer storage medium. The computer storage medium may be non-volatile. The non-transitory computer storage medium stores computer-readable instructions, and when the non-transitory computer-readable instructions are executed by a processor, the method in any embodiment in the first aspect is implemented.

A sixth aspect of this application provides a computer program product including instructions. When the computer program product runs on a computer, the computer is enabled to perform the method in any embodiment of the first aspect.

A seventh aspect of this application provides a chip system. The chip system includes a processor, configured to support a network device in implementing functions in the foregoing aspects, for example, sending or processing data and/or information in the foregoing method. In an embodiment, the chip system further includes a memory, where the memory is configured to store program instructions and data for the network device. The chip system may include a chip, or may include a chip and another discrete component.

It can be learned from the foregoing technical solutions that embodiments of this application have the following advantages:

This application provides a route sending method and a device. A route is allocated to a corresponding route group based on a type of a next-hop address in the route, and a route is independently selected from each route group for sending. This ensures that all network devices supporting different address types can normally learn of routes, ensures normal operation of services during network evolution, and improves flexibility of route sending.

BRIEF DESCRIPTION OF DRAWINGS

FIG. 1 is a schematic diagram of an application scenario of a route sending method according to an embodiment of this application;

FIG. 2 is a schematic flowchart of a route sending method according to an embodiment of this application;

FIG. 3a is a schematic flowchart of a route sending method 300 according to an embodiment of this application;

FIG. 3b is a schematic flowchart of a route sending method 300 according to an embodiment of this application;

DESCRIPTION OF EMBODIMENTS

Figure 3C:
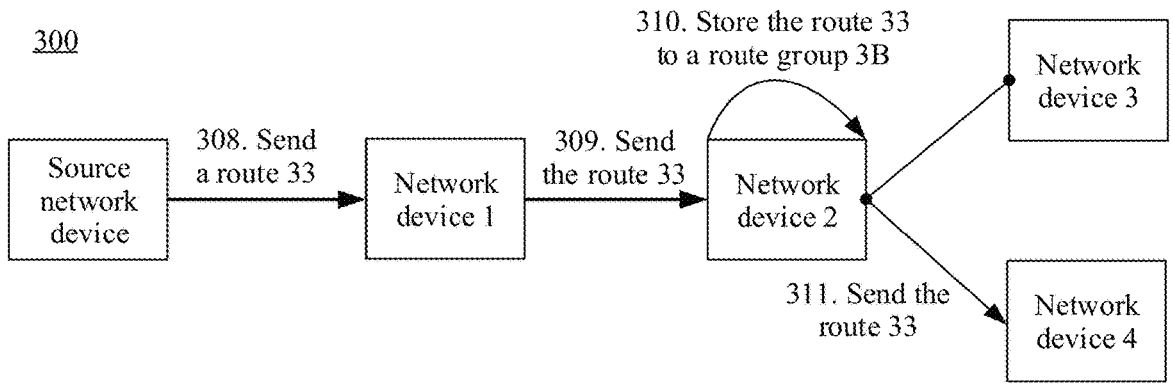
FIG. 3c is a schematic flowchart of a route sending method 300 according to an embodiment of this application.

To make objectives, technical solutions, and advantages of this application clearer, the following describes embodiments of this application with reference to accompanying drawings. It is clearly that the described embodiments are merely some but not all of the embodiments of this application. A person of ordinary skill in the art may learn that, as a new application scenario emerges, the technical solutions provided in embodiments of this application are also applicable to a similar technical problem.

In the specification, claims, and accompanying drawings of this application, terms "first", "second", and so on are intended to distinguish between similar objects but do not necessarily indicate a specific order or sequence. It should be understood that data used in such a way is interchangeable in proper circumstances, so that embodiments described herein can be implemented in other orders than the order illustrated or described herein. In addition, terms "include", "have" and any other variants thereof are intended to cover non-exclusive inclusions, for example, a process, method, system, product, or device including a series of operations or modules is not necessarily limited to those clearly listed operations or modules, but may include other operations or modules that are not clearly listed or are inherent to such a process, method, product, or device. Naming or numbering of operations in this application does not mean that the operations in the method procedures need to be performed in a time/logical order indicated by the naming or numbering. An execution order of the operations in the procedures that have been named or numbered can be changed based on a technical objective to be achieved, provided that same or similar technical effects can be achieved. Division into units in this application is logical division or may be other division in an actual implementation. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms. This is not limited in this application. In addition, units or subunits described as separate parts may or may not be physically separate, may or may not be physical units, or may be distributed into a plurality of circuit units. Some or all of the units may be selected depending on actual requirements to achieve the objectives of the solutions of this application.

With network evolution, for example, evolution from a conventional multi-protocol label switching (MPLS) network to an IPv6 segment routing (SRv6) network, an IPv4 neighbor and an IPv6 neighbor coexist in a same address family. During route learning, according to related regulations of routing protocols, a route reflector needs to select an optimal route from a plurality of routes with a same prefix (a plurality of routes with a same IP address of a source routing device) for sending. For example, if a next-hop address of an optimal route is an IPv4 neighbor, the route reflector can send the optimal route only to a neighboring network device supporting IPv4; if a next-hop address of the optimal route is an IPv6 neighbor, the route reflector can send the optimal route only to a neighboring network device supporting IPv6. As a result, network devices are prone to fail to learn of corresponding routes.

In view of this, embodiments of this application provide a route sending method. During route learning, a route is allocated to a corresponding route group based on a type of a next-hop route, and a route is independently selected from each route group for sending, so that a plurality of routes with a same prefix are sent based on the route groups. This ensures that all network devices supporting different address types can normally learn of routes, ensures normal operation of services during network evolution, and improves flexibility of route sending.

FIG. 1 is a schematic diagram of an application scenario of a route sending method according to an embodiment of this application. As shown in FIG. 1, the application scenario specifically includes a network device 1, a network device 2, and a network device 3. The network device 2 is connected to both the network device 1 and the network device 3. During route learning, after receiving a route sent by a source network device, the network device 1 sends the route to the network device 2. The route includes an IP address of the source network device, an IP address (a next-hop address) of the network device 1, and identification information 1. The identifier 1 identifies that the IP address of the network device 1 belongs to a type 1. After receiving the route, the network device 2 determines a route group 1 corresponding to the route, and determines, based on the route group 1, to send the route to the network device 3. All routes in the route group have the same IP address of the source network device, and next-hop addresses in all the routes in the route group belong to the type 1. In other words, the network device 2 allocates, to a same route group, the routes having the same IP address of the source network device and a same type of next-hop addresses, to select a route from each route group for sending. This ensures that all network devices supporting different address types can normally learn of routes, ensures normal operation of services during network evolution, and improves flexibility of route sending.

FIG. 2 is a schematic flowchart of a route sending method according to an embodiment of this application. As shown in FIG. 2, the route sending method provided in this embodiment of this application includes the following operations:

201. A second network device receives a first route sent by a first network device, where the first route includes an IP address of a source network device, an IP address of the first network device, and first identification information, the first identification information identifies that the IP address of the first network device belongs to a first type, and the first network device is a next-hop network device of the source network device.

In this embodiment, the source network device is connected to the first network device. The connection may be a direct connection, or may be a connection for establishing a neighbor relationship according to the BGP, or the like. The source network device may send the first route to the first network device, so that the first network device can learn of the first route. For example, the source network device may be, for example, a customer edge (CE) device. The first network device may be, for example, a provider edge (PE) device. The source network device may advertise a private network route, that is, the first route, to the first network device. The second network device is a network device having a route forwarding capability, and can forward, based on a received route, the route to a corresponding network device. The second network device may be, for example, a route reflector or a route forwarding device.

The first route includes the IP address of the source network device, that is, a prefix of the first route may be the IP address of the source network device. The first route further includes the IP address of the first network device. The first network device is the next-hop network device of the source network device. In other words, the first route includes an IP address of the next-hop network device. The first route further includes the first identification information. The first identification information identifies a type of the IP address of the next-hop network device in the first route. For example, when the IP address of the first network device belongs to the first type, the first identification information may identify that the IP address of the first network device belongs to the first type. For example, the first type may be, for example, an IPv4 type or an IPv6 type. This is not limited in this embodiment.

In an embodiment, an MPLS tunnel is deployed between the first network device and the second network device, and the first network device may send the first route to the second network device through the MPLS tunnel.

In an embodiment, the first network device and the second network device are neighboring devices. The first network device may send the first route to the neighboring device of the first network device according to a corresponding routing protocol, so that the second network device can learn of the first route. For example, the first network device and the second network device may be IPv4 neighbors or IPv6 neighbors.

202. The second network device sends the first route, where the first route is a route determined by the second network device based on a first route group, all routes in the first route group have the same IP address of the source network device, and the IP address of the next-hop network device of the source network device included in each of all the routes belongs to the first type.

In this embodiment, after the second network device receives the first route sent by the first network device, the second network device may determine, based on the IP address of the source network device and the first identification information in the first route, a route group corresponding to the first route. The first route group is the route group corresponding to the first route. Routes in the first route group all have the same IP address of the source network device, that is, prefixes of all the routes in the first route group are the same. In addition, the IP address of the next-hop network device of the source network device included in each route in the first route group belong to the first type.

After the second network device determines that the first route belongs to the first route group, the second network device determines the first route based on the first route group, and sends the first route to another network device, so that the another network device can learn of the first route.

In an embodiment, that the second network device sends the first route may include: If the first type is the IPv4 type, the second network device sends the first route to one or more neighboring network devices supporting IPv4; or if the first type is the IPv6 type, the second network device sends the first route to one or more neighboring network devices supporting IPv6. That is, when the IP address of the first network device included in the first route belongs to the IPv4 type, it indicates that the first route is a route learned of by an IPv4 neighbor. Therefore, the second network device sends the first route to one or more neighboring network devices supporting IPv4, so that all IPv4 neighboring network devices of the second network device can learn of the first route. Similarly, when the IP address of the first network device included in the first route is of the IPv6 type, it indicates that the first route is a route learned of by an IPv6 neighbor, so that the second network device sends the first route to one or more neighboring network devices supporting IPv6. The one or more neighboring network devices supporting IPv4 or IPv6 may be, for example, one or more PE devices.

In this embodiment, after receiving the route, the network device determines, based on the address of the source network device and a type of the next-hop address in the route, the route group to which the first route belongs, and determines a to-be-sent route in the route group, so that routes having the same IP address of the source network device but different types of next-hop addresses can be allocated to different route groups, that is, the routes having a same prefix but different types of next-hop addresses can independently participate in route selection. This ensures that network devices supporting different address types can normally learn of routes, ensures normal operation of services during network evolution, and improves flexibility of route sending.

In an embodiment, that the first route is a route determined by the second network device based on the first route group may include: The second network device selects the first route from the first route group based on a Border Gateway Protocol best path selection algorithm. Simply, the first route is an optimal route selected from the first route group by the second network device based on the Border Gateway Protocol best path selection algorithm. Selecting a route according to the Border Gateway Protocol best path selection algorithm may be selecting a route with an optimal path from a plurality of routes according to a set of predefined criteria. For example, the criteria corresponding to the Border Gateway Protocol best path selection algorithm may include but are not limited to: a path length corresponding to a route, a weight of the route, a neighbor address of the route, or the like. For example, the second network device may select the first route with a shortest path length from the first route group based on the Border Gateway Protocol best path selection algorithm.

In an embodiment, that the second network device sends the first route may include: The second network device sends the first route, where the IP address of the next-hop network device of the source network device in the first route is the IP address of the first network device; or the second network device sends the first route, where the first route is an updated first route, and the IP address of the next-hop network device of the source network device in the updated first route is updated to an IP address of the second network device. Briefly, when the second network device sends the first route to another network device, the second network device may directly send the first route to the another network device without modifying the first route. The second network device may alternatively update the first route. For example, the second network device may modify the next-hop address (that is, the IP address of the next-hop network device of the source network device) in the first route to the IP address of the second network device, and then send the updated first route to the another network device.

In an embodiment, the second network device may deploy ADD-PATH based on the first route group, where the first route group includes a plurality of routes. That the second network device sends the first route is that the second network device sends the first route and a second route based on the ADD-PATH, where the second route is one of the plurality of routes in the first route group.

It should be noted that, after the second network device deploys the ADD-PATH based on the route group, routes in a same route group may form the ADD-PATH, that is, the second network device may simultaneously send a plurality of routes in a same route group to a peer network device, so that the peer network device (that is, a network device receiving the plurality of routes) implements load sharing or route backup based on the plurality of received routes. Specifically, the peer network device may learn of, based on the plurality of obtained routes, a plurality of links to a same destination address. Load sharing or route backup may be implemented between the plurality of links, thereby ensuring reliability of data transmission.

In an embodiment the first route further includes fourth identification information, and the fourth identification information identifies an address family to which the first route belongs. That the first route is a route determined by the second network device based on the first route group includes: the second network device determines the first route group based on the address family identified by the fourth identification information, the IP address of the source network device, and the first type; and the second network device determines the first route based on the determined first route group.

Briefly, routes in a same address family that have the same IP address of the source network device and belong to a same type are allocated to a same route group, and routes in different address families are allocated to different route groups.

Generally, one or more address families can be configured on a network device. During route learning, the second network device sends a route to a neighboring network device in a same address family based on an address family corresponding to the route, so that the route can be learned of between network devices configured with a same address family. Specifically, in an embodiment, one or more of the following address families are configured for the second network device: a VPNv4 address family, a VPNv6 address family, an EVPN address family, or an MVPN address family.

For ease of understanding, the route sending method provided in this embodiment of this application is described in detail with reference to specific application scenarios. FIG. 3a is a schematic flowchart of a route sending method 300 according to an embodiment of this application. As shown in FIG. 3a, the route sending method 300 provided in this embodiment of this application includes the following operations:

301. A source network device sends a route 31 to a network device 1.

The network device 1 is a next-hop network device of the source network device. The source network device may be, for example, a CE device, and the network device 1 may be, for example, a PE device. The route 31 includes an IP address (which may be, for example, 1.1.1.1) of the source network device, an IP address (which may be, for example, 2.2.2.2) of the network device 1, and identification information 311 (which may be, for example, IPv4 Nexthop). The IP address of the network device 1 is an IPv4 address, and the identification information 311 identifies that the IP address of the network device 1 belongs to a type 1 (that is, an IPv4 type).

302. The network device 1 sends the route 31 to a network device 2.

The network device 2 is an IPv4 neighbor of the network device 1, and the network device 2 is capable of route forwarding. The network device 1 sends the route 31 to the network device 2, so that the network device 2 can send the route 31 to another neighboring network device supporting IPv4, and the route 31 is learned of between the network devices. Specifically, the network device 2 may be, for example, a route reflector or a route forwarding device.

303. The network device 2 sends the route 31 to a network device 3.

Before sending the route 31 to the network device 3, the network device 2 may determine a route group 3A corresponding to the route 31, and determine, based on the route group 3A, to send the route 31. For example, IP addresses of source network devices corresponding to routes in the route group 3A are all 1.1.1.1, and IP addresses of the next-hop network devices of the source network devices corresponding to the routes in a route group 3A are all 2.2.2.2. In this embodiment, the route group 3A includes only the route 31. Therefore, the network device 2 may directly determine, based on the route group 3A, to send the route 31.

The network device 3 is an IPv4 neighbor of the network device 2, that is, a neighboring network device supporting IPv4.

FIG. 3b is a schematic flowchart of the route sending method 300 according to this embodiment of this application. As shown in FIG. 3b, in a specific embodiment, the route sending method 300 provided in this embodiment of this application further includes the following operations:

304. The source network device sends a route 32 to the network device 1.

Both the IP address of the source network device included in the route 32 and the IP address of the network device 1 included in the route 32 are consistent with those in the route 31, and identification information 321 in the route 32 also identifies that the IP address of the network device 1 belongs to the type 1.

305. The network device 1 sends the route 32 to the network device 2.

306. The network device 2 determines the route 32 based on the route group 3A.

Specifically, after receiving the route 32, the network device 2 may store the route 32 to the route group 3A. In this case, the route group 3A includes the route 31 and the route 32, and the network device 2 may select, from the route group 3A, a route learned of by the neighboring network device of the network device 2. For example, the second network device 2 may select the route 32 from the route group 3A based on a Border Gateway Protocol best path selection algorithm, where the route 32 is a selected optimal route.

307. The network device 2 sends the route 32 to the network device 3.

Because the network device 2 determines, based on the route group 3A, the route 32 newly stored to the route group 3A, the network device 2 sends the route 32 to the neighboring network device (the network device 3) that supports IPv4 and that is of the network device 2.

It should be noted that, if a route determined by the network device 2 based on the route group 3A is the route 31 in operation 306 (for example, when the route 31 is an optimal route in the route group 3A, the network device 2 selects the route 31), because the network device 2 has sent the route 31 to the network device 3, the network device 2 may no longer send the route 31 to the network device 3.

FIG. 3c is a schematic flowchart of the route sending method 300 according to this embodiment of this application. As shown in FIG. 3c, in a specific embodiment, the route sending method 300 provided in this embodiment of this application further includes the following operations:

308. The source network device sends a route 33 to the network device 1.

The IP address of the source network device included in the route 33 is consistent with the IP address (for example, 1.1.1.1) of the source network device included in the route 31. The IP address of the network device 1 included in the route 33 is also consistent with that included in the route 31, and identification information 331 in the route 33 identifies that the IP address of the network device 1 belongs to a type 2.

It may be understood that, in a case that the network device 1 supports both IPv4 and IPv6, the network device 1 may have a corresponding IPv4 address and a corresponding IPv6 address. For example, in a case that the IP address of the network device 1 in the route 31 is the IPv4 address, the IP address of the network device 1 in the route 33 may be specifically the IPv6 address, and the identification information 331 in the route 33 identifies that the IP address of the network device 1 is of an IPv6 type.

309. The network device 1 sends the route 33 to the network device 2.

The network device 2 also supports IPv6, and the network device 2 is an IPv6 neighbor of the network device 1.

310. The network device 2 stores the route 33 to a route group 3B.

Because the identification information 331 in the route 33 identifies that the IP address of the network device 1 belongs to the type 2, the network device 2 may store the route 33 to the route group 3B.

311. The network device 2 sends the route 33 to a network device 4.

Specifically, after storing the route 33 to the route group 3B, the network device 2 may determine the route 33 based on the route 32 (for example, determine, based on the Border Gateway Protocol best path selection algorithm, that the route 33 is an optimal route in the route group 3B), and then the network device 2 sends the route 33 to the network device 4. The network device 4 is an IPv6 neighbor of the network device 2.

Figure 4:
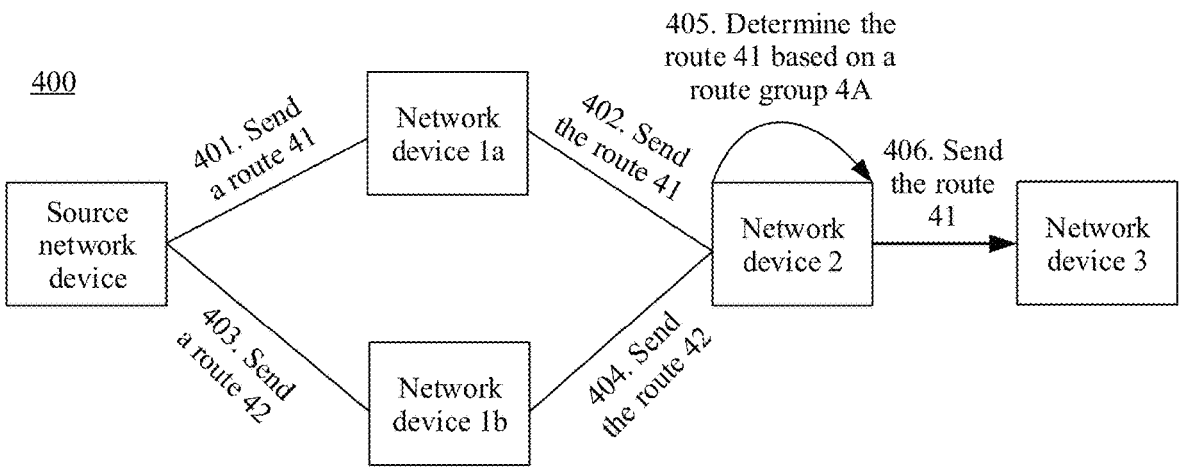
FIG. 4 is a schematic flowchart of a route sending method 400 according to an embodiment of this application.

FIG. 4 is a schematic flowchart of a route sending method 400 according to an embodiment of this application. As shown in FIG. 4, in a specific embodiment, the route sending method 400 provided in this embodiment of this application includes the following operations:

401. A source network device sends a route 41 to a network device 1a.

The route 41 includes an IP address (which may be, for example, 1.1.1.1) of the source network device, an IP address (which may be, for example, 2.2.2.2) of the network device 1a, and identification information 411 (which may be, for example, IPv4 Nexthop). The IP address of the network device 1a is an IPv4 address, and the identification information 411 identifies that the IP address of the network device 1a belongs to a type 1 (that is, an IPv4 type).

402. The network device 1a sends the route 41 to a network device 2.

The network device 2 is an IPv4 neighbor of the network device 1a, and the network device 2 is capable of route forwarding.

403. The source network device sends a route 42 to a network device 1b.

The route 42 includes the IP address (which may be, for example, 1.1.1.1) of the source network device, an IP address (which may be, for example, 3.3.3.3) of the network device 1b, and identification information 421 (which may be, for example, IPv4 Nexthop). The IP address of the network device 1b is an IPv4 address, and the identification information 421 identifies that the IP address of the network device 1b also belongs to the type 1 (that is, the IPv4 type).

404. The network device 1b sends the route 42 to the network device 2.

The network device 2 is an IPv4 neighbor of the network device 1b, and the network device 2 is capable of route forwarding.

405. The network device 2 determines the route 41 based on a route group 4A.

After the network device 2 receives the route 41 and the route 42, the network device 2 may store both the route 41 and the route 42 in the route group 4A, and the network device 2 determines the route 41 based on the route group 4A. For example, the second network device 2 may select the route 41 from the route group 4A based on a Border Gateway Protocol best path selection algorithm, where the route 41 is a selected optimal route.

406. The network device 2 sends the route 41 to a network device 3.

The network device 3 is an IPv4 neighbor of the network device 2, that is, a neighboring network device supporting IPv4.

It should be noted that a sequence of operation 402 and operation 404 is not limited in this embodiment. If operation 402 is performed before operation 404 (that is, the network device 2 receives the route 41 before the route 42), the network device 2 may first send the route 41 to the network device 3, and no longer send the route to the network device 3 after receiving the route 42. If operation 402 is performed after operation 404 (that is, the network device 2 receives the route 42 before the route 41), the network device 2 may first send the route 42 to the network device 3, and then send the route 41 to the network device 3 after receiving the route 41.

In other words, in this embodiment, a network device configured to perform route forwarding and learning may receive routes sent by different network devices, and determine, based on the IP address of the source network device and the identification information in the routes, a route group corresponding to the routes, for example, allocate routes sent by different network devices to a same route group, and then determine, from the route group, a route sent to another neighboring network device through selection.

Figure 5:
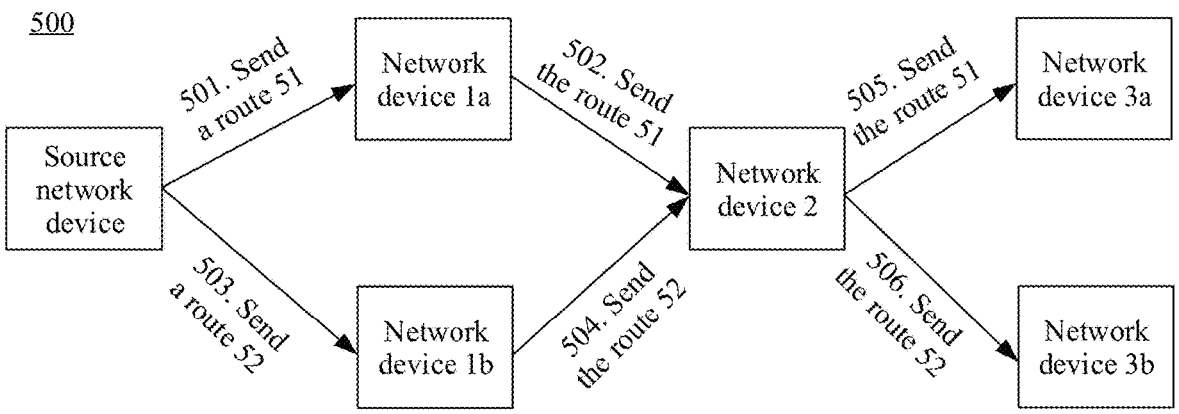
FIG. 5 is a schematic flowchart of a route sending method 500 according to an embodiment of this application.

FIG. 5 is a schematic flowchart of a route sending method 500 according to an embodiment of this application. As shown in FIG. 5, in a specific embodiment, the route sending method 500 provided in this embodiment of this application includes the following operations:

501. A source network device sends a route 51 to a network device 1a.

The route 51 includes an IP address (which may be, for example, 1.1.1.1) of the source network device, an IP address (which may be, for example, 2.2.2.2) of the network device 1a, and identification information 511 (which may be, for example, IPv4 Nexthop). The IP address of the network device 1a is an IPv4 address, and the identification information 511 identifies that the IP address of the network device 1a belongs to a type 1 (that is, an IPv4 type).

502. The network device 1a sends the route 51 to a network device 2.

The network device 2 is an IPv4 neighbor of the network device 1a, and the network device 2 is capable of route forwarding.

503. The source network device sends a route 52 to a network device 1b.

The route 42 includes the IP address (which may be, for example, 1.1.1.1) of the source network device, an IP address (which may be, for example, ::C9B4) of the network device 1b, and identification information 521 (which may be, for example, IPv6 Nexthop). The IP address of the network device 1b is an IPv6 address, and the identification information 521 identifies that the IP address of the network device 1b belongs to a type 2 (that is, an IPv6 type).

504. The network device 1b sends the route 52 to the network device 2.

The network device 2 is an IPv6 neighbor of the network device 1b, and the network device 2 is capable of route forwarding.

505. The network device 2 sends the route 51 to a network device 3a.

Before sending the route 51 to the network device 3a, the network device 2 may determine a route group 5A corresponding to the route 51, and determine, based on the route group 5A, to send the route 51. In this embodiment, the route group 5A includes only the route 51. Therefore, the network device 2 may directly determine, based on the route group 5A, to send the route 51.

The network device 3a is an IPv4 neighbor of the network device 2, that is, a neighboring network device supporting IPv4.

506. The network device 2 sends the route 52 to a network device 3b.

Before the network device 2 sends the route 52 to the network device 3b, the network device 2 may determine a route group 5B corresponding to the route 52, and determine, based on the route group 5B, to send the route 52. In this embodiment, the route group 5B includes only the route 52. Therefore, the network device 2 may directly determine, based on the route group 5B, to send the route 52.

The network device 3b is an IPv6 neighbor of the network device 2, that is, a neighboring network device supporting IPv6.

In other words, in this embodiment, a network device configured to perform route forwarding and learning may receive routes sent by neighboring network devices supporting a plurality of IP address types, and determine, based on the IP address of the source network device and the identification information in the routes, the route groups corresponding to the routes, for example, allocate the routes sent by the neighboring network devices supporting the plurality of IP address types to corresponding route groups, and then determine, based on the route group, a route that needs to be sent to another neighboring network device.

Figure 6:
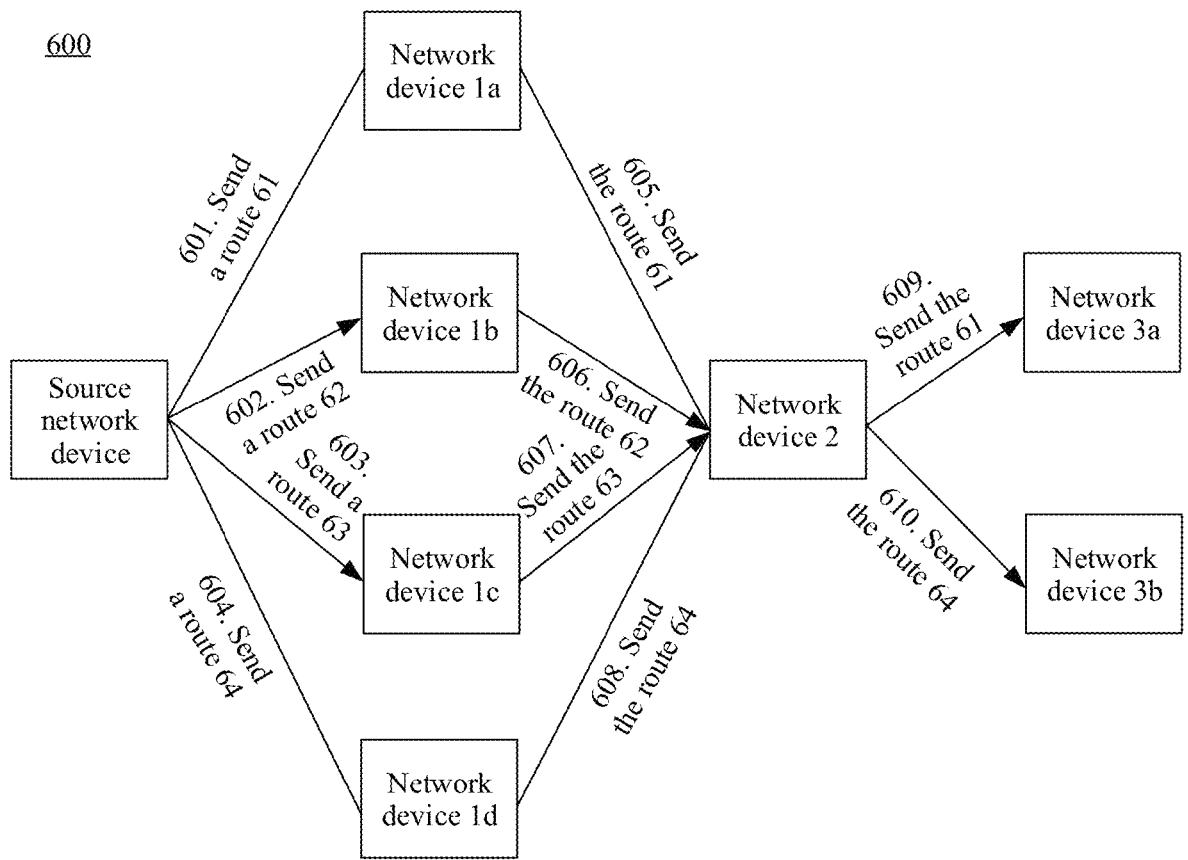
FIG. 6 is a schematic flowchart of a route sending method 600 according to an embodiment of this application.

FIG. 6 is a schematic flowchart of a route sending method 600 according to an embodiment of this application. As shown in FIG. 6, in a specific embodiment, the route sending method 600 provided in this embodiment of this application includes the following operations:

601. A source network device sends a route 61 to a network device 1a.

The route 61 includes an IP address (which may be, for example, 1.1.1.1) of the source network device, an IP address (which may be, for example, 2.2.2.2) of the network device 1a, and identification information 611 (which may be, for example, IPv4 Nexthop). The IP address of the network device 1a is an IPv4 address, and the identification information 611 identifies that the IP address of the network device 1a belongs to a type 1 (that is, an IPv4 type).

602. The source network device sends a route 62 to a network device 1b.

The route 62 includes the IP address (which may be, for example, 1.1.1.1) of the source network device, an IP address (which may be, for example, 3.3.3.3) of the network device 1b, and identification information 621 (which may be, for example, IPv4 Nexthop). The IP address of the network device 1b is an IPv4 address, and the identification information 621 identifies that the IP address of the network device 1b belongs to the type 1 (that is, the IPv4 type).

603. The source network device sends a route 63 to a network device 1c.

The route 63 includes the IP address (which may be, for example, 1.1.1.1) of the source network device, an IP address (which may be, for example, ::C9B4) of the network device 1c, and identification information 631 (which may be, for example, IPv6 Nexthop). The IP address of the network device 1c is an IPv6 address, and the identification information 631 identifies that the IP address of the network device 1c belongs to a type 2 (that is, an IPv6 type).

604. The source network device sends a route 64 to a network device 1d.

The route 64 includes the IP address (which may be, for example, 1.1.1.1) of the source network device, an IP address (which may be, for example, ::C9B5) of the network device 1d, and identification information 641 (which may be, for example, IPv6 Nexthop). The IP address of the network device 1d is an IPv6 address, and the identification information 641 identifies that the IP address of the network device 1d belongs to the type 2 (that is, the IPv6 type).

605. The network device 1a sends the route 61 to a network device 2.

606. The network device 1b sends the route 62 to the network device 2.

607. The network device 1c sends the route 63 to the network device 2.

608. The network device 1d sends the route 64 to the network device 2.

The network device 2 is an IPv4 neighbor of both the network device 1a and the network device 1b, and the network device 2 is an IPv6 neighbor of both the network device 1c and the network device 1d.

609. The network device 2 sends the route 61 to a network device 3a.

After receiving the route 61 and the route 62, the network device 2 stores the route 61 to a route group 6A based on the identification information 611 of the route 61, and stores the route 62 to the route group 6A based on the identification information 621 of the route 62. Subsequently, the network device determines the route 61 based on the route group 6A (for example, selects the route 61 from the route group 6A based on a Border Gateway Protocol best path selection algorithm), and sends the route 61 to the network device 3a.

The network device 3a is an IPv4 neighbor of the network device 2, that is, a neighboring network device supporting IPv4.

610. The network device 2 sends the route 64 to a network device 3b.

After receiving the route 63 and the route 64, the network device 2 stores the route 63 to a route group 6B based on the identification information 631 of the route 63, and stores the route 64 to the route group 6B based on the identification information 641 of the route 64. Subsequently, the network device determines the route 64 based on the route group 6B (for example, selects the route 64 from the route group 6B based on the Border Gateway Protocol best path selection algorithm), and sends the route 64 to the network device 3b.

The network device 3b is an IPv6 neighbor of the network device 2, that is, a neighboring network device supporting IPv6.

In the foregoing embodiment, an example in which a same route group includes two routes is used for description. In an actual application scenario, the same route group may include more than two routes. The network device 2 may select one route from the route group including the more than two routes, and advertise each neighboring device of a type corresponding to the route group.

In other words, in this embodiment, a network device configured to perform route forwarding and learning may receive routes sent by neighboring network devices supporting a plurality of IP address types, and determine, based on the IP address of the source network device and the identification information in the routes, route groups corresponding to the routes, for example, allocate the routes sent by the neighboring network devices supporting the plurality of IP address types to corresponding route groups, then determine, based on the route group, a route that needs to be sent to another neighboring network device, and finally, forward, based on the route group, the route selected from the route group to a corresponding network device.

Figure 7:
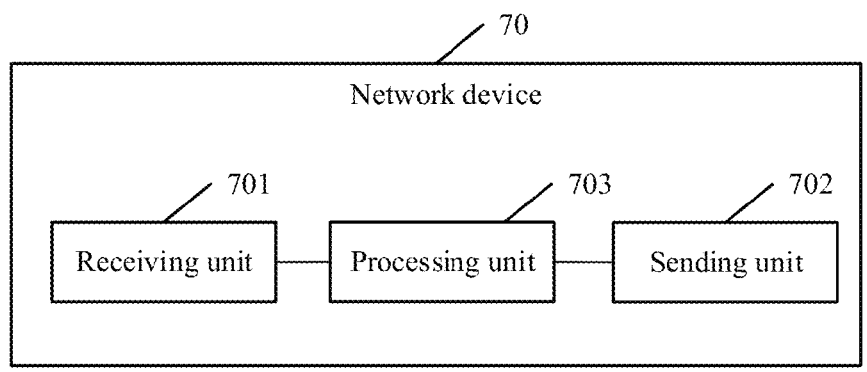
FIG. 7 is a schematic diagram of a structure of a network device according to an embodiment of this application.

FIG. 7 is a schematic diagram of a structure of a network device according to an embodiment of this application. The network device 70 provided in this embodiment of this application may be, for example, the first network device or the network device 2 in the foregoing method embodiments. The network device 70 may include, for example: a receiving unit 701, configured to receive a first route sent by a first network device, where the first route includes an IP address of a source network device, an IP address of the first network device, and first identification information, the first identification information identifies that the IP address of the first network device belongs to a first type, and the first network device is a next-hop network device of the source network device; and a sending unit 702, configured to send the first route, where the first route is a route determined by the second network device based on a first route group, all routes in the first route group have the same IP address of the source network device, and an IP address of the next-hop network device of the source network device included in each of all the routes belongs to the first type.

In an embodiment, the first type is an IPv4 type or an IPv6 type. The sending unit 702 is specifically configured to: if the first type is the IPv4 type, send the first route to one or more neighboring network devices supporting IPv4; or if the first type is the IPv6 type, send the first route to one or more neighboring network devices supporting IPv6.

In an embodiment, the network device further includes a processing unit 703, configured to select the first route from the first route group based on a Border Gateway Protocol best path selection algorithm.

In an embodiment, the receiving unit 701 is further configured to receive a second route sent by a third network device, where the first route includes the IP address of the source network device, an IP address of the third network device, and second identification information, and the third network device is a next-hop network device of the source network device. The network device further includes a processing unit 703, configured to store the second route to the first route group based on a case that the second identification information belongs to the first type.

In an embodiment, the receiving unit 701 is further configured to receive a third route sent by the first network device, where the third route includes the IP address of the source network device, the IP address of the first network device, and third identification information. The network device further includes a processing unit 703, configured to store the third route to a second route group based on a case that the third identification information belongs to a second type.

In an embodiment, the sending unit 702 is further configured to send the first route, where the IP address of the next-hop network device of the source network device in the first route is the IP address of the first network device; or send the first route, where the first route is an updated first route, and the IP address of the next-hop network device of the source network device in the updated first route is updated to an IP address of the second network device.

In an embodiment, the processing unit 703 is further configured to deploy ADD-PATH based on the first route group, where the first route group includes a plurality of routes; and the sending unit 702 is further configured to send the first route and a second route based on the ADD-PATH, where the second route is one of the plurality of routes in the first route group.

In an embodiment, the first route further includes fourth identification information, and the fourth identification information identifies an address family to which the first route belongs. The network device further includes a processing unit 703, configured to determine the first route group based on the address family identified by the fourth identification information, the IP address of the source network device, and the first type; and determine the first route based on the determined first route group.

In an embodiment, one or more of the following address families are configured for the second network device: a VPNv4 address family, a VPNv6 address family, an EVPN address family, or an MVPN address family.

In the foregoing embodiments, some units (or components) of the network device may be implemented by using a hardware circuit, and some other units (or components) are implemented by using software, or all units (or components) may be implemented by using a hardware circuit, or all units (or components) are implemented by using software. For example, the processing unit 703 may be specifically a processor of the network device 70, and the receiving unit 701 and the sending unit 702 may be specifically transceivers or the like of one or more network devices 70.

Figure 8:
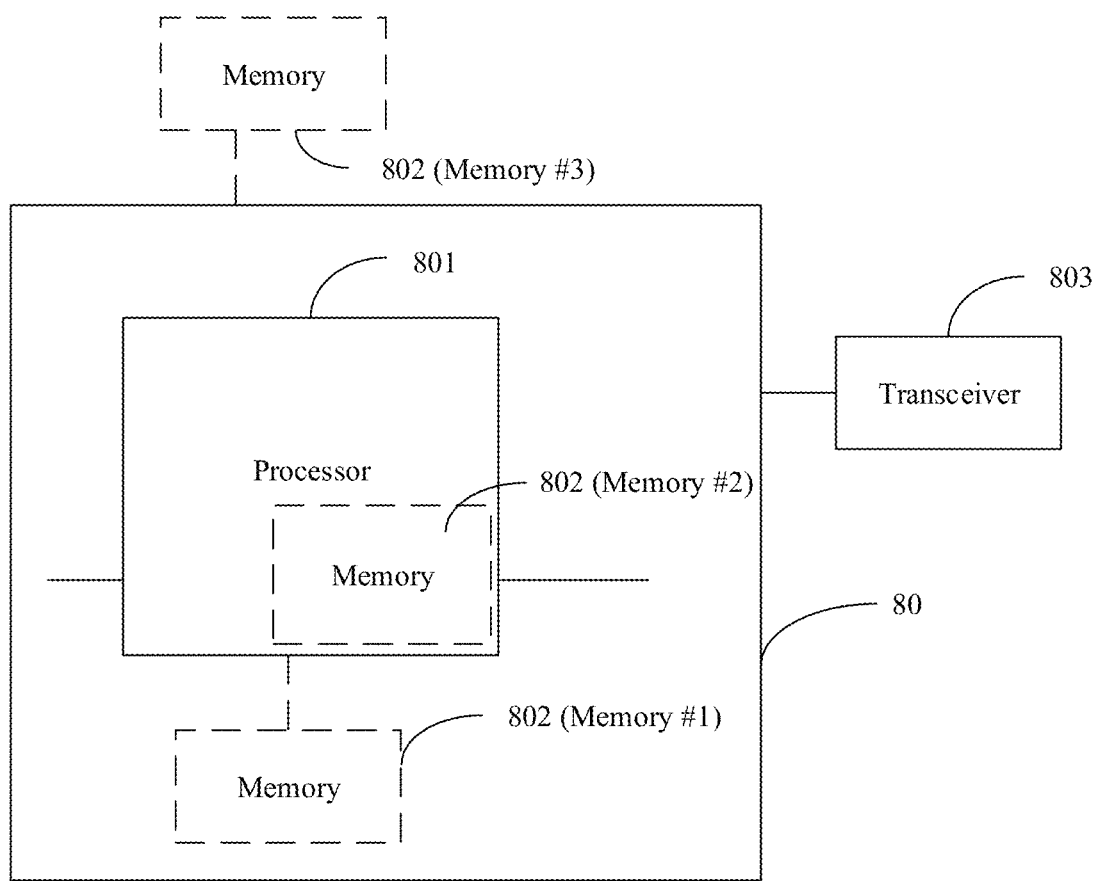
FIG. 8 is a schematic diagram of a structure of a network device according to an embodiment of this application.

FIG. 8 is a schematic diagram of a structure of a network device according to an embodiment of this application. As shown in FIG. 8, a network device 80 is provided. The network device 80 may be, for example, the second network device in the foregoing method embodiments. The network device 80 includes a processor 801. The processor 801 is coupled to a memory 802. The memory 802 (memory (Memory) #3) may be independent of the processor 801 or the network device 80; or the memory 802 (Memory #1 or Memory #2) may be inside the processor 801 or the network device 80. The memory 802 may be a physically independent unit, or may be storage space, a network hard disk, or the like on a cloud server. In an embodiment, there may be one or more memories 802. When there are a plurality of memories 802, they may be located at a same location or different locations, and may be used independently or collaboratively.

The memory 802 is configured to store computer-readable instructions (or referred to as a computer program).

The processor 801 is configured to read the computer-readable instructions to implement the method provided in any one of the foregoing aspects and implementations related to the network device.

In an embodiment, the network device 80 further includes a transceiver 803, configured to receive and send data.

In addition, the processor 801 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. In addition, the memory 802 may include a volatile memory, for example, a random-access memory (RAM). The memory may alternatively include a non-volatile memory, for example, a flash memory, a hard disk drive (HDD), a solid-state drive (SSD), a cloud storage, a network attached storage, or a network drive. The memory may further include a combination of the foregoing types of memories or another medium or product in any form that has a storage function.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software functional unit and sold or used as an independent product, the integrated unit may be stored in a non-transitory computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a network device, or the like) to perform all or some of the operations of the methods described in embodiments of this application. The non-transitory computer-readable storage medium includes any medium that can store program code, such as a USB flash drive, a removable hard disk, a read-only memory, a random-access memory, a magnetic disk, or an optical disc.

What is claimed is:

1. A route sending method, wherein the method comprises:

receiving, by a second network device, a first route sent by a first network device, wherein the first route comprises an Internet Protocol (IP) address of a source network device, an IP address of the first network device, and first identification information, the first identification information identifies that the IP address of the first network device belongs to a first type, and the first network device is a next-hop network device of the source network device;

sending, by the second network device, the first route, wherein the first route is a route determined by the second network device based on a first route group, all routes in the first route group have the same IP address of the source network device, and an IP address of the next-hop network device of the source network device comprised in each route of all of the routes belongs to the first type;

receiving, by the second network device, a third route sent by the first network device, wherein the third route comprises the IP address of the source network device, the IP address of the first network device, and third identification information; and storing, by the second network device, the third route to a second route group when the third identification information belongs to a second type.

2. The route sending method according to claim 1, wherein the first type is an Internet Protocol version 4 (IPv4) type or an Internet Protocol version 6 (IPv6) type, and the sending, by the second network device, the first route comprises:

when the first type is the IPv4 type, sending, by the second network device, the first route to one or more neighboring network devices supporting IPv4; or when the first type is the IPv6 type, sending, by the second network device, the first route to one or more neighboring network devices supporting IPv6.

3. The route sending method according to claim 1, wherein determining the first route by the second network device based on the first route group comprises:

selecting, by the second network device, the first route from the first route group based on a Border Gateway Protocol best path selection algorithm.

4. The route sending method according to claim 1, wherein the method further comprises:

receiving, by the second network device, a second route sent by a third network device, wherein the second route comprises the IP address of the source network device, an IP address of the third network device, and second identification information, and the third network device is a next-hop network device of the source network device; and storing, by the second network device, the second route to the first route group when the second identification information belongs to the first type.

5. The route sending method according to claim 1, wherein the sending, by the second network device, the first route comprises:

sending, by the second network device, the first route, wherein the IP address of the next-hop network device of the source network device in the first route is the IP address of the first network device; or sending, by the second network device, the first route, wherein the first route is an updated first route, and the IP address of the next-hop network device of the source network device in the updated first route is updated to an IP address of the second network device.

6. The route sending method according to claim 1, wherein the method further comprises:

deploying, by the second network device, advertisement of multiple paths (ADD-PATH) in Border Gateway Protocol based on the first route group, wherein the first route group comprises a plurality of routes; and the sending, by the second network device, the first route is: sending, by the second network device, the first route and a second route based on the ADD-PATH, wherein the second route is one of the plurality of routes in the first route group.

7. The route sending method according to claim 1, wherein the first route further comprises fourth identification information, the fourth identification information identifies an address family to which the first route belongs, and that the first route is a route determined by the second network device based on the first route group comprises:

determining, by the second network device, the first route group based on the address family identified by the fourth identification information, the IP address of the source network device, and the first type; and determining, by the second network device, the first route based on the determined first route group.

8. The route sending method according to claim 7, wherein one or more of the following address families are configured for the second network device: a virtual private network-Internet Protocol version 4 (VPNv4) address family, a virtual private network-Internet Protocol version 6 (VPNv6) address family, an Ethernet virtual private network (EVPN) address family, or a mobile virtual private network (MVPN) address family.

9. A second network device, comprising:

a receiving unit, configured to receive a first route sent by a first network device, wherein the first route comprises an Internet Protocol (IP) address of a source network device, an IP address of the first network device, and first identification information, the first identification information identifies that the IP address of the first network device belongs to a first type, and the first network device is a next-hop network device of the source network device;

a sending unit, configured to send the first route, wherein the first route is a route determined by the second network device based on a first route group, all routes in the first route group have the same IP address of the source network device, and an IP address of the next-hop network device of the source network device comprised in each route of all of the routes belongs to the first type; wherein the receiving unit is further configured to receive a third route sent by the first network device, wherein the third route comprises the IP address of the source network device, the IP address of the first network device, and third identification information; and a processing unit, configured to store the third route to a second route group when the third identification information belongs to a second type.

10. The second network device according to claim 9, wherein the first type is an IPv4 type or an IPv6 type, and the sending unit is specifically configured to:

when the first type is the IPv4 type, send the first route to one or more neighboring network devices supporting IPv4; or when the first type is the IPv6 type, send the first route to one or more neighboring network devices supporting IPv6.

11. The second network device according to claim 9, wherein the processing unit is further configured to select the first route from the first route group based on a Border Gateway Protocol best path selection algorithm.

12. The second network device according to claim 9, wherein the receiving unit is further configured to receive a second route sent by a third network device, wherein the first route comprises the IP address of the source network device, an IP address of the third network device, and second identification information, and the third network device is a next-hop network device of the source network device; and the processing unit is further configured to store the second route to the first route group based on a case that the second identification information belongs to the first type.

13. The second network device according to claim 9, wherein the sending unit is further configured to send the first route, wherein an IP address of the next-hop network device of the source network device in the first route is the IP address of the first network device; or send the first route, wherein the first route is an updated first route, and an IP address of the next-hop network device of the source network device in the updated first route is updated to an IP address of the second network device.

14. The second network device according to claim 9, wherein the processing unit is further configured to deploy ADD-PATH based on the first route group, wherein the first route group comprises a plurality of routes; and the sending unit is further configured to send the first route and a second route based on the ADD-PATH, wherein the second route is one of the plurality of routes in the first route group.

15. The second network device according to claim 9, wherein the first route further comprises fourth identification information, the fourth identification information identifies an address family to which the first route belongs, and the processing unit is further configured to: determine the first route group based on the address family identified by the fourth identification information, the IP address of the source network device, and the first type; and determine the first route based on the determined first route group.

16. The second network device according to claim 15, wherein one or more of the following address families are configured for the second network device: a VPNv4 address family, a VPNv6 address family, an EVPN address family, or an MVPN address family.

17. A non-transitory computer-readable storage medium that stores computer-readable instructions, which, executed by a processor of a second network device, cause the second network device to perform operations comprising:

receiving a first route sent by a first network device, wherein the first route comprises an Internet Protocol (IP) address of a source network device, an IP address of the first network device, and first identification information, the first identification information identifies that the IP address of the first network device belongs to a first type, and the first network device is a next-hop network device of the source network device;

sending, the first route, wherein the first route is a route determined by the second network device based on a first route group, all routes in the first route group have the same IP address of the source network device, and an IP address of the next-hop network device of the source network device comprised in each route of all of the routes belongs to the first type;

receiving a third route sent by the first network device, wherein the third route comprises the IP address of the source network device, the IP address of the first network device, and third identification information; and storing, by the second network device, the third route to a second route group when the third identification information belongs to a second type.

18. The non-transitory computer-readable storage medium according to claim 17, wherein the first type is an Internet Protocol version 4 (IPv4) type or an Internet Protocol version 6 (IPv6) type, and the sending the first route comprises:

when the first type is the IPv4 type, sending the first route to one or more neighboring network devices supporting IPv4; or when the first type is the IPv6 type, sending the first route to one or more neighboring network devices supporting IPv6.

* * * * *